United States Patent Office 3,094,574
Patented June 18, 1963

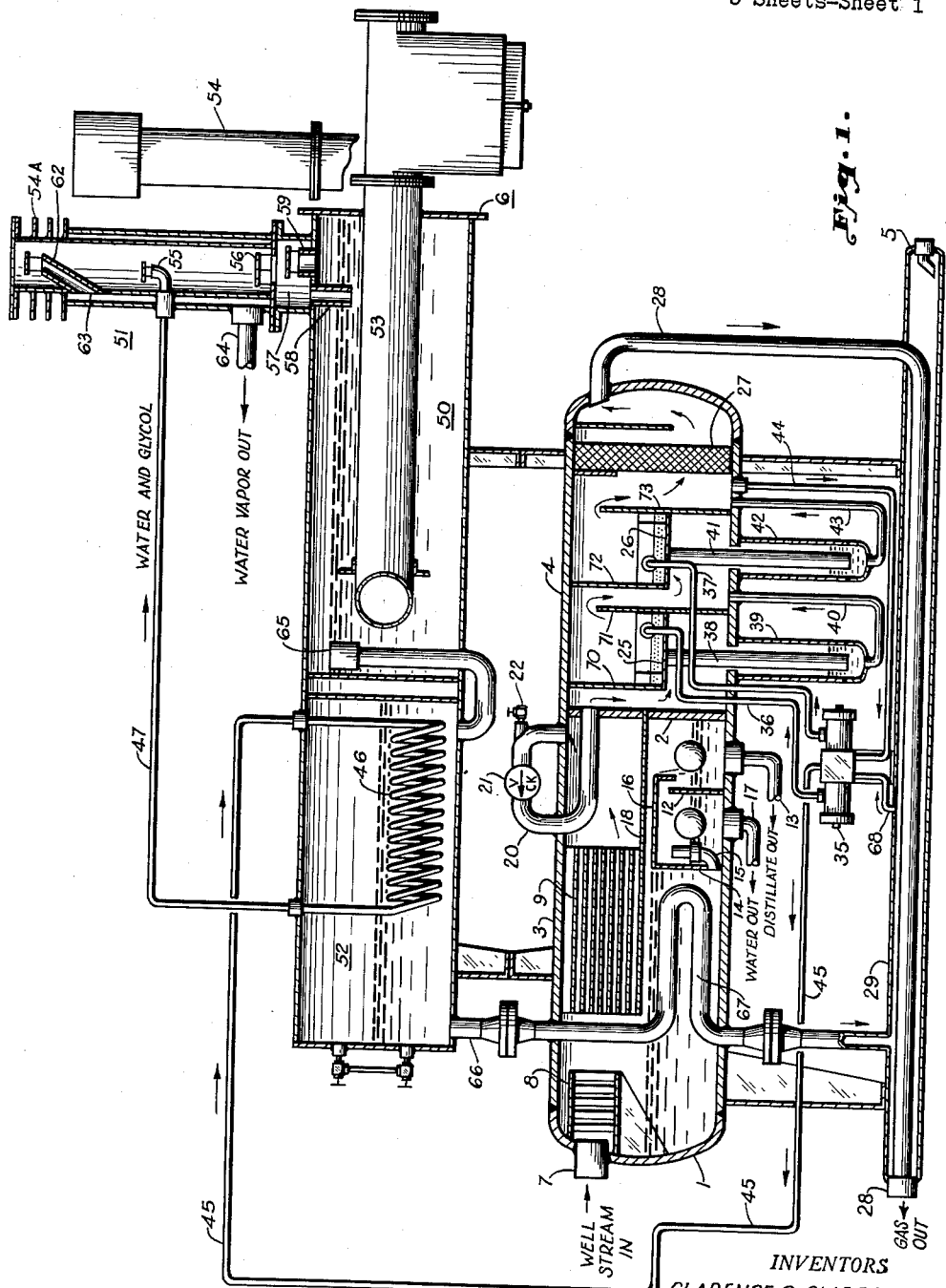

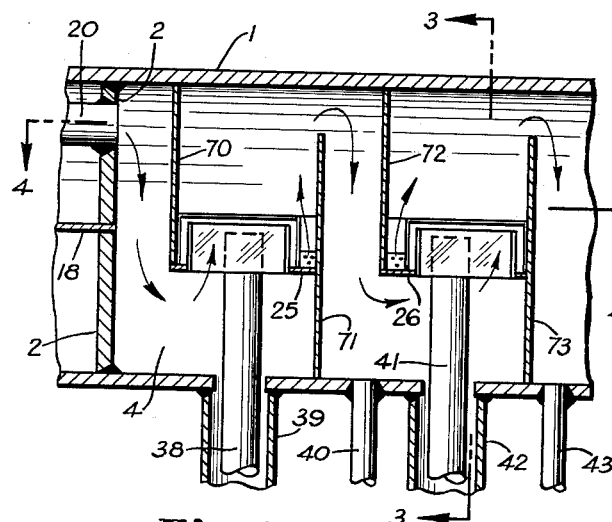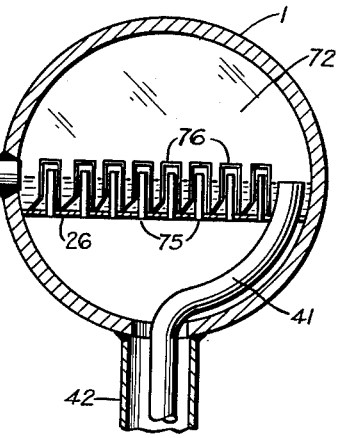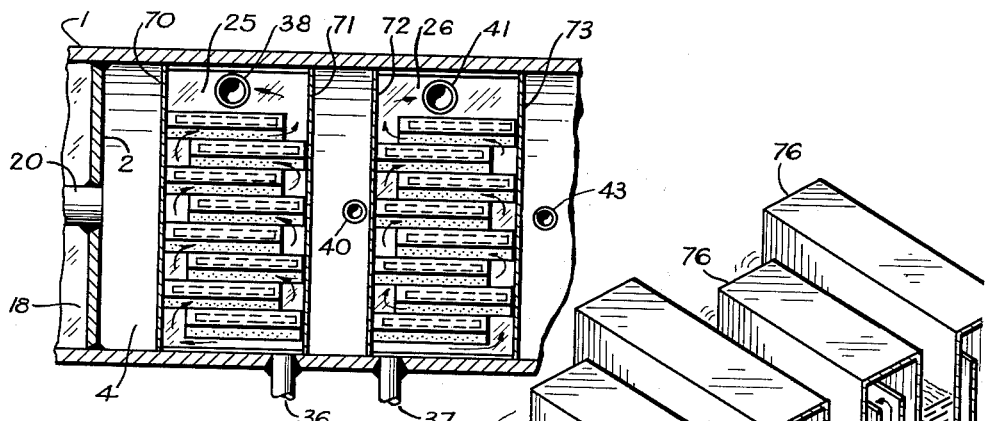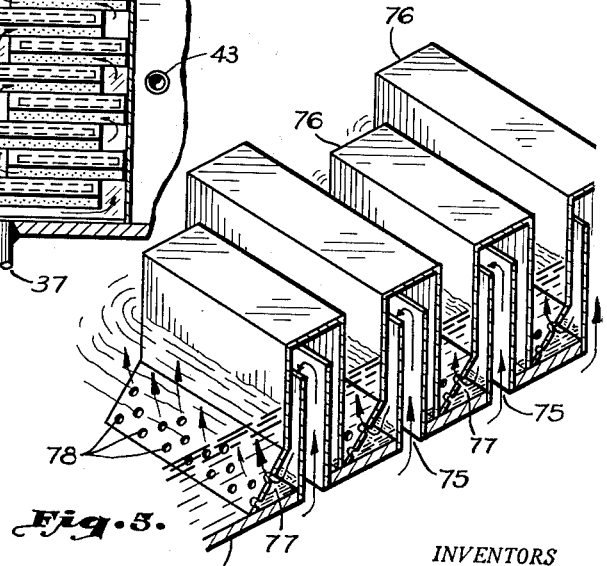

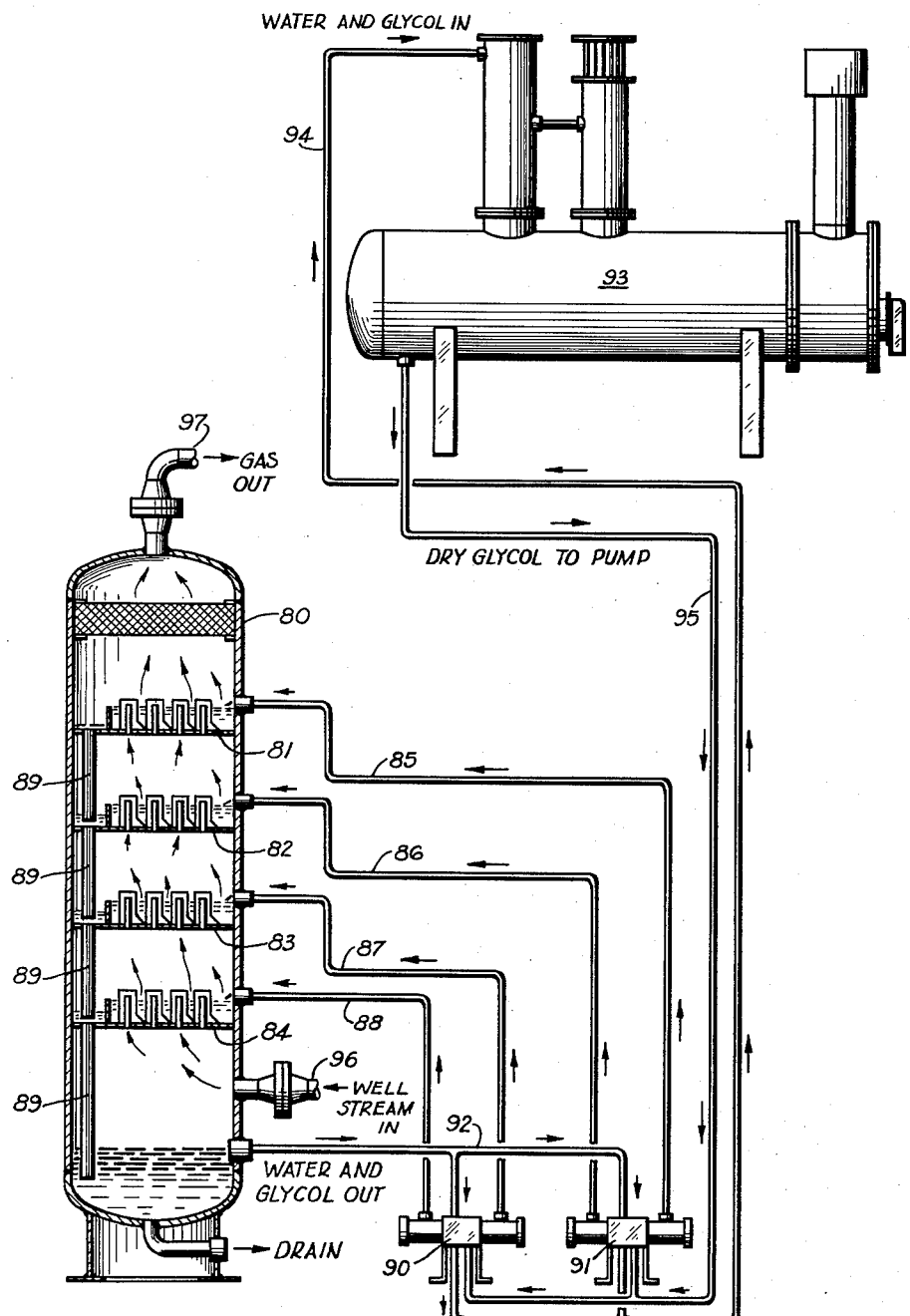

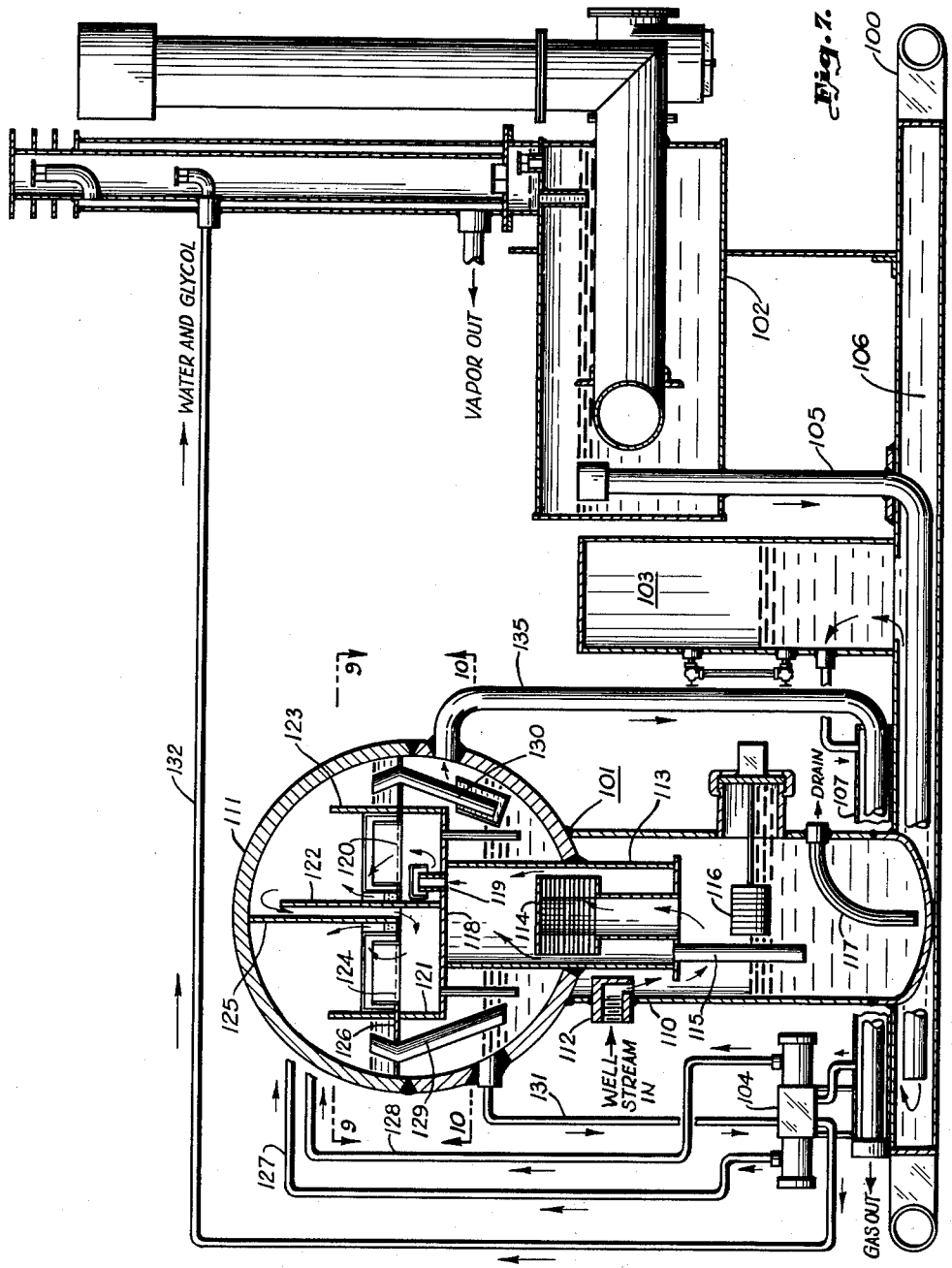

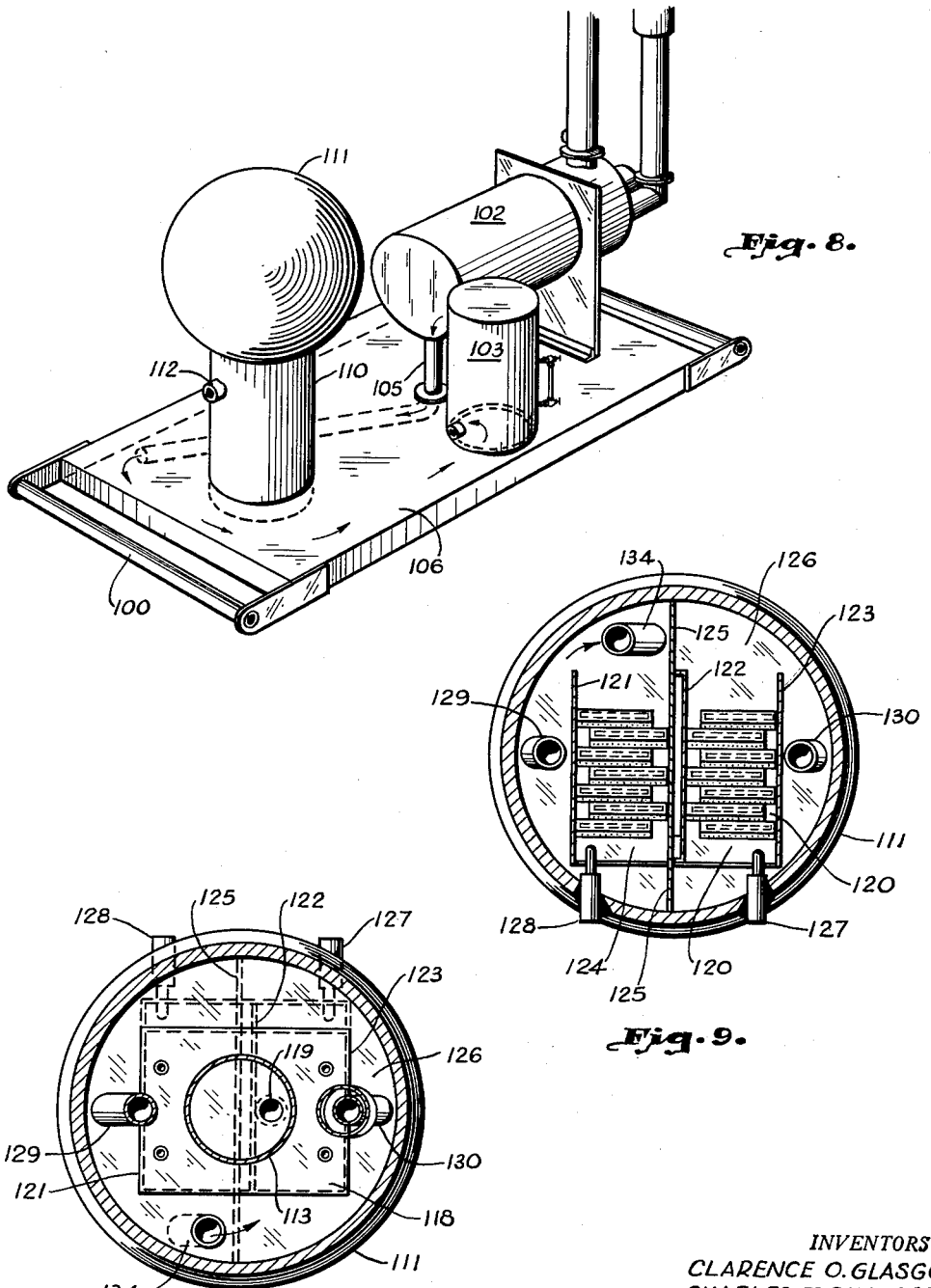

3,094,574
GAS DEHYDRATOR
Clarence O. Glasgow, Tulsa, and Charles T. Patterson, Sand Springs, Okla., assignors to National Tank Company, Tulsa, Okla., a corporation of Nevada
Filed Oct. 20, 1958, Ser. No. 768,267
6 Claims. (Cl. 261—23)

The present invention relates to new and useful improvements in gas dehydrators.

The invention is particularly concerned with dehydrators for natural gas in which a liquid desiccant, such as glycol, is employed. The invention is primarily concerned with the absorber, or liquid-gas contactor, of a dehydrator in which water is removed from the natural gas with the desiccant.

The need for removal of excessive amounts of water from the vapor phase of gas streams is common knowledge. At least three reasons exist for removing this water;

(1) To provide a natural gas product which will comply with pipe line specification.

(2) To avoid interruption in the continuous flow of gas to a drilling rig or to a gas lift installation.

(3) To reduce corrosion in gas gathering and gas transmission lines.

A widely used liquid desiccant system for drying gas is the glycol dehydrator. Generally, in this type of system, a stream of natural gas is passed through a contactor enclosure, including a pressure tower or vessel, and is there brought into intimate contact with a stream of glycol having a relatively low water vapor pressure. The glycol absorbs water or moisture from the gas stream in a continuous fashion as the gas flows through the contactor enclosure, thus reducing the water vapor dewpoint of the gas stream to the desired level for further handling or transportation of the gas. The glycol which has absorbed water, and hence has an increased water vapor pressure, is circulated through a reconcentrator wherein the absorbed water is removed or separated from the glycol. The reconcentrated glycol is returned to the contactor enclosure for absorption of moisture from further quantities of gas. The system is continuous in operation, with the gas stream passing constantly through the contactor enclosure being dehydrated therein while the glycol flows continuously in a closed cycle through the contactor to absorb water and through the reconcentrator wherein the absorbed water is removed from the glycol.

The pressure tower, or vessel, of a contactor enclosure is usually a cylindrical shell, held in a vertical position. The trays upon which liquid desiccant and wet gas is mixed are stacked above each other in the vertical shell. The individual tray area designs are restricted by the cross-sectional area of the shell as the liquid desiccant passes downwardly from tray to tray and the wet gas passes upwardly in countercurrent flow.

The dewpoint depression obtain by a liquid desiccant dehydrator is dependent on several variables. One variable is the differential between the water vapor pressure of the natural gas to be dehydrated and the water vapor pressure of the liquid desiccant brought into contact with the gas in the absorber vessel. This differential of vapor pressures creates a force which drives the water from the natural gas and into the liquid desiccant. The higher the differential maintained between the vapor pressures, the greater the final depression of the dewpoint of the gas. The usual practice of circulating liquid desiccant over the trays, in series, develops a lower water vapor pressure of the desiccant on those trays beyond the first tray, with corresponding reduction of the driving force available to remove water from the gas.

Another variable on which dewpoint depression depends is the degree of intimacy with which liquid desiccant and wet natural gas are brought together for applying the driving force of differential between water vapor pressures. It has been common to mount bubble caps on trays over which liquid desiccant is flooded from an entrance point toward an exit point. This arrangement causes portions of the desiccant flooding the tray to be diverted around the bubble caps and fail to contact the wet gas distributed by the bubble caps intimately and uniformly.

The principal object of the present invention is to provide a design for the absorber, or contactor, vessel of a liquid desiccant dehydrator system which will provide for designing individual tray areas, as required to accomodate the amount of gas to be dehydrated, in a shell of predetermined diameter.

Another object is to provide supplies of liquid desiccant of uniform water vapor pressures to individual contact trays of an absorber, or contactor vessel, of a dehydrator system.

Another object is to supply liquid desiccant to a contactor tray in a channelled, or confined flow from the entrance to the tray to the exit of the tray.

Another object is to distribute wet gas up through a channelled, or confined, flow of liquid desiccant as it moves continuously over the tray from the entrance to the tray to the exit of the tray.

Another object is to automatically adjust the distribution of wet gas in a channelled, or confined, flow of liquid desiccant as it moves from the entrance to the tray to the exit of the tray.

Still another object of the invention is to heat exchange the hot reconcentrated desiccant with cooler fluids of a liquid desiccant dehydrator system during gravity flow before pumping the desiccant to the absorber and to the point of reconcentration.

The present invention contemplates a liquid desiccant dehydration system having an absorber vessel extended horizontally and having contacting trays arranged in tandem and parallel to the axis of the vessel.

The invention further contemplates supplying reactivated liquid desiccant in parallel to contacting trays to maintain a water vapor pressure of the desiccant which is uniform with respect to all trays.

The invention further contemplates a form for bubble caps on the contacting trays of an absorber which provides a relatively narrow channel of the liquid desiccant confined to a path which extends over the tray in an elongated, serpentine form from the entrance to the exit of the tray.

The invention further contemplates that gas to be dehydrated is distributed with a sieve plate forming the bottom of the relatively narrow channel defined by the bubble caps on the tray in a predetermined pattern.

The invention further contemplates a sieve plate for the bubble caps being formed by an inclined perforated plate with the gas directed downwardly from within the housing of the bubble cap to pass the gas through the number of inclined plate perforations proportionate to the quantity of gas passing through the tray.

The invention further contemplates a physical relation between the components of a liquid desiccant dehydration system wherein the reconcentrator is mounted above the separator section so the hot reconcentrated desiccant gravities through heat exchange association with the desiccant before it is reconcentrated, the liquids of the well stream through the separator section, and the dehydrated gas before reaching the pump supplying the absorber section and the reconcentrator.

Other objects, advantages and features of this invention will become apparent to one skilled in the art upon consideration of the written specification, appended claims, and attached drawings wherein;

FIG. 1 is a sectioned elevation of the components of a glycol dehydrator system embodying the present invention;

FIG. 2 is a sectioned elevation of the part of the absorber in which the mixing trays are mounted;

FIG. 3 is a sectioned elevation of the absorber taken along lines 3—3 of FIG. 2;

FIG. 4 is a sectioned plane view of the adsorber taken along lines 4—4 in FIG. 2;

FIG. 5 is a perspective of a part of the bubble cap structure mounted on the trays of the absorber;

FIG. 6 is a partially sectioned elevation of a glycol dehydrator system using a vertical absorber vessel;

FIG. 7 is a sectioned elevation of a glycol dehydrator system using a spherical absorber vessel;

FIG. 8 is a perspective of a portion of the system of FIG. 7 showing the separator section mounted in the heat exchanger of the skid;

FIG. 9 is a section along lines 9—9 of FIG. 7; and

FIG. 10 is a section along lines 10—10 of FIG. 7.

FIG. 1 shows the components of a glycol dehydrator system as physically oriented on a base skid. The basic process of the system centers in and about shell 1, which is in the form of a cylindrical tank having its longitudinal axis horizontally extended as mounted on the skid.

Shell 1 is divided into two compartments. Wall 2 is vertical and transverse across shell 1 to divide the shell interior into a separator section 3 and an absorber section 4. The skid on which shell 1 is mounted is a framework rugged enough to make moving the complete system as a unit practical.

A reconcentrator unit 6 is mounted above shell 1. Details of the mounting structure for the reconcentrator 6, on shell 1 and skid 5, are not illustrated. The primary purpose of FIG. 1 is to illustrate the flow pattern of fluids through the units mounted on the skid. Only the interconnecting conduits, required to give full illustration to the flow pattern of the fluids, are shown in detail.

Conduit 7 is shown bringing the well stream into separator 3. From conduit 7, the well stream is directed onto, and through, a system of impinging baffles 8. Aligned with the system of impinging baffles 8, within separator 3, is a system of closely spaced plates 9.

In the lower part of separator 3, a system of transverse wall baffles are arranged to form liquid sumps. Baffle 12 extends across shell 1 to form a sump with the sides of shell 1 and wall 2. Oil is skimmed into this sump and taken therefrom by conduit 13. Baffle 13 is spaced from baffle 12 to form a second sump. Water is conducted into this sump by an adjustable siphon 15. A cover for this second sump is provided by cover baffle 16 and oil flows over this cover baffle 16 into the sump. The water is removed from its sump through conduit 17. Floats in each sump, regulate the removal of the oil and water from their respective sumps.

A baffle 18 extends horizontally across the shell from the bottom of plate unit 9 to wall 2. Plate unit 9 does not extend to wall 2, thereby forming a space above baffle 18 into which the gaseous phase of the well stream flows to be removed by a conduit, into the absorber section 4.

Conduit 20 extends out of the top of shell 1, from separator 3 and back into the interior of separator 3 to deliver the gaseous phase of the well stream through wall 2 and into absorber section 4. Conduit 20 contains a check valve 21 and a manually operated vent valve 22.

Absorber section 4 contains trays 25 and 26 extending horizontally, and in tandem, within shell 1. On these trays the gaseous phase of the well stream is brought into intimate contact with liquid desiccant. Both the baffling and conduits associated with these trays are shown to better advantage in subsequent illustrations. Essentially, the gaseous phase is led up through each tray. The gas flows through the trays in series and is passed through a mist extractor 27 and to conduit 28.

Conduit 28 is directed down into a heat exchanger in skid 5. FIG. 1 indicates conduit 28 associated with surrounding shell 29 as the heat exchanger.

*Well Stream Flow Pattern*

The well stream can now be traced completely through the dehydrator of FIG. 1. The well stream is composed of a gaseous phase as well as distillate and water. Conduit 7 brings all three phases of the well stream from a well, not shown, and conducts them into an efficient separating process in shell 1. Baffles 8 and plate unit 9 are similar to arrangements disclosed in at least Dixon 2,349,944 and Glasgow 2,657,760. Most of the liquid is knocked from the well stream by impinging on baffles 8 and more liquid is scrubbed from this gaseous phase by the plates of unit 9. The liquid knocked from the well stream by baffles 8 drops to the bottom of this separator section of shell 1. The liquids which are scrubbed from the gaseous phase by the plates of unit 9 drop to baffle 18 and flow down into the bottom of shell 1.

The liquids, both oil and water, collect in the sump formed in the front end of shell 1 by baffle 14. Siphon 15 removes the water which stratifies out of the oil-water mixtures in this sump and conducts it into the sump between baffle 14 and baffle 12. This water is then removed from shell 1 through conduit 17. The oil floating on the top of the water of the first sump is skimmed over cover baffle 16 into the sump formed between baffle 12 and wall 2. With the majority of both liquids separated from the gaseous phase of the well stream, the gaseous phase can be taken into the absorber section 4 of shell 1 for the degree of dehydration desired.

Conduit 20 takes the gaseous phase out of unit 9 into absorber section 4. Check valve 21 insures that flow will be from the absorber section through conduit 20, should the pressure of the well stream drop suddenly. This avoids the possibility of back flow through the absorber blowing liquid desiccant from trays 25 and 26 with loss of the desiccant into separator section 3.

Vent valve 22, in front of check valve 21, is a convenient means to vent separator 3 to atmosphere when it is desired to unload the well of liquid. Under some operating conditions, where wells are operated intermittently, liquids collect in the well and it is advisable to vent the well stream to atmosphere for a time during startup of operation. The vent valve 22 in the system will prevent a great deal of waste from occurring, as the liquids will be caught in separator section 3.

The gaseous sream from conduit 20 is taken into absorber section 4 for contact with desiccant. Partitions across shell 1, in absorber section 4, direct the wet gas up through bubble cap structure on trays 25 and 26 to disperse the wet gas through desiccant on the trays so they will intimately contact each other to facilitate the water being driven from the gas and into the liquid desiccant.

The velocity of the passage of the gas through the contacting trays may cause finely divided particles of glycol to be carried along with the dehydrated stream of gas. A conventional form of mist extractor 27 will aid in scrubbing this liquid desiccant from the dehydrated gas prior to its delivery to conduit 28. The dehydrated gas then passes in heat exchange with reconcentrated desiccant in shell 29 in order to cool the reconcentrated desiccant and raise its absorbing capacity.

*Liquid Desiccant Flow Pattern in Shell 1*

It has been disclosed that liquid desiccant on trays 25 and 26 is brought into intimate contact with wet gas passing up through these trays. The desiccant is supplied with a low water-vapor pressure relative to the water-vapor pressure of the gas being dehydrated. This desiccant absorbs water, or moisture, from the gas stream in a continuous fashion as the gas flows up through the contactor trays. The result is to reduce the water vapor dew point of the gas stream to a level desired for further handling, or transportation, of the gas.

Each of trays 25 and 26 may be supplied fresh, or reconcentrated, glycol, as the desiccant, by pump 35. A satisfactory form for pump 35 is manufactured by Kimray, Inc., Oklahoma City, Oklahoma. The basic requirement of the pumping system is that it simultaneously supply trays 25 and 26 with glycol of uniform water-vapor pressures. The form of pump 35 illustrated conveniently discharges separate supplies from the ends of a common piston. As illustrated, pump 35 is connected to conduits 36 and 37 to supply trays 25 and 26 simultaneously.

Conduit 36 specifically supplies glycol to tray 25. After the liquid desiccant has contacted the wet stream of natural gas it is removed from tray 25 through downcomer 38 which depends into a well 39 of shell 1. Glycol in the bottom of well 39 seals downcomer 38 so that the wet natural gas will not be forced up downcomer 38, but will be routed up through tray 25. The glycol from well 39 is forced up conduit 40 by the differential pressure across tray 25 and into the compartment of absorber 4 which is beneath tray 26.

Conduit 37 specifically supplies fresh glycol to tray 26 and downcomer 41 removes the glycol from tray 26 into well 42. The glycol of conduit 40, from well 39, is also dropped down into well 42. The combined flows of glycol, in well 42, is then taken through conduit 43 back up into the section of absorber 4 in which the mist extractor 27 is located by the differential pressure across tray 26. The total flow of glycol is then removed from the absorber 4 through conduit 44, connected to an intake of pump 35. Pump 35 transfers the glycol of conduit 44 from absorber 4 to the reconcentrator by way of conduit 45.

Reconcentration of Glycol

The water absorbed by the glycol supply to trays 25 and 26 must be removed in order for the glycol to be used again. This water-rich glycol in conduit 45 is circulated through a reconcentrator where the absorbed water is removed or separated from the glycol. In general, the water and glycol is passed down through a still column, and heat applied to the base of this column vaporizes the water while permitting the glycol to descend and collect as reconcentrated glycol.

The glycol which has been reconcentrated by heat has an elevated temperature which lowers its absorbing ability. In order to remove this heat from the reconcentrated glycol and conserve it, the incoming water-rich glycol of conduit 45 is passed through heat exchanger 46 within a collected body of reconcentrated glycol to be recirculated, by pump 35 to trays 25 and 26. Conduit 47 takes the water-rich glycol from heat exchanger 46 into the still column where the absorbed water is removed. The reconcentrated glycol continues to gravity flow in heat exchange contact with the separator liquids and the dehydrated gas to raise its absorbing ability.

Glycol Reconcentration

The apparatus for reconcentrating the glycol, or vaporizing the water from the glycol, is shown in FIG. 1 as mounted above shell 1. This apparatus may be considered in three parts. Heating chamber 50 has still column 51 mounted on top of it and surge chamber 52 mounted on one end.

Considering heating chamber 50, a return bend firetube 53 extends horizontally into compartment 50. The firetube is supplied with the usual burner (not shown) in one leg of the heater tube, and exhaust or flue and gas stack 54 extends upwardly from the opposite leg of the firetube. Fuel gas is supplied to the burner and firetube. The hot combustion gas is passed through the return vent of firetube 53 to the stack 54 and imparts heat in the desired quantities to the compartment 50.

Reflux or reconcentrating tower or column 51 extends upwardly from the shell of heating compartment 50. The column is in the form of an elongated pipe of small diameter relative to the shell of heating compartment 50 and carries heat-dissipating fins 54A at its upper end.

The preheated, water-rich, or dilute, disiccant leaves heat exchanger 46 and passes by conductor 47 into the wall of column 51 and terminating therewithin in an upturned elbow 55. Thus, the dilute and preheated desiccant is released upwardly in an intermediate portion of the column 51 through which heated vapors are passed upwardly and the desiccant is permitted to flow, or drop, downwardly within the column.

Desirably, the column 51 is filled with a suitable packing material. In the lower portion of the column, below the inlet elbow 55 a foraminous element 56 extends across the column. This element 56 supports packing used in the column which permits liquid desiccant to flow down from the packing and vapors to flow up through the packing. A sump 57 is formed below element 56 by a plate. A discharge pipe 58 extends downwardly from the sump 57 into the heating compartment 50. A riser 59 directs vapors from heating chamber 50 upward, through the packing. Thus, the preheated dilute desiccant is drained downwardly through column 51 while being subjected to the application of the heated vapors rising upwardly through the column.

Within the compartment 50, the dilute desiccant is heated to the desired degree to vaporize water therefrom. These are the vapors which pass up riser 59. The vapors continuously rise, passing upwardly countercurrent to the downwardly moving liquid, and on to the outlet 62 of the column. Obviously, some desiccant may be vaporized in the heating step. In the upward passage of this vaporized desiccant, countercurrent to the incoming dilute desiccant, as well as in the cooling of the vapors as they pass upwardly through the column 51 and in the fin section of 55, substantially all of the desiccant will be condensed and returned by gravity into the heating compartment. Thus, reflux and bubble column conditions are established to effect efficient and relatively complete separation of the desiccant and water. The desiccant may not be entirely freed of water, but its water content will be reduced to a point at which its water vapor pressure is at the desired level for introduction into the absorber 4.

The water vapor passing out 62 is conducted through a jacket 63 about still column 51 and out 64. This jacket will insulate the column from ambient conditions and preserve the reflux balance.

The hot reconcentrated desiccant, from which moisture has been removed by the heat in chamber 50, is drawn off through a siphon 65 and taken into surge chamber 52. The surge chamber 52 is of sufficient volume to accommodate varying flows of desiccant. The reconcentrated desiccant is cooled by passage over heat exchanger 46 and flows by gravity down pipe 66 into shell 1. Pipe 66 connects with heat exchanger 67, immersed in the stratifying liquids of the sump between baffle 14 and the front of shell 1 in separator 3.

Heat exchanger 67 provides an additional means whereby the reconcentrated glycol is further cooled to raise its absorbing capacity. As a source of heat, exchanger 67 melts hydrates which may be formed in its liquid sump of separator 3. Further, this source of heat prevents freezing of the water in this sump during cold weather operation. From heat exchanger 67, the reconcentrated glycol flows by gravity into shell 29 of skid 5 for still further cooling by heat exchange with the dehydrated gas of conduit 28. The cooled, reconcentrated, glycol is then taken by pump 35, through conduit 68 for discharge onto trays 25 and 26.

The arrangement of reconcentrator 6 above the separator section 3 and exchanger shell 29 provides a new result in the function of glycol dehydrators. Pump 35 elevates the rich glycol to the stripping column of the reconcentrator and gravity returns the liquid to the pump for supply to the trays. The pump receives the glycol at its lowest temperature in the system for physically elevating it to the trays and the reconcentrator. The seals of the pump are thereby given maximum protection from the heat put in, and removed from, the glycol. One result is an increased life for the pump seals. Another result is the efficiency gained from unifying the pumping of the system, centralizing it in a single mechanism. When the pump receives the rich glycol from the absorber section 4, it lifts the glycol to the reconcentrator from where reconcentrated glycol flows, by gravity, into heat exchange with the rich glycol going to the reconcentrator, into heat exchange with the liquids of the well stream in separator 3 and into heat exchange with the dehydrated gas from absorber section 4. Therefore, when the reconcentrated glycol has returned, by gravity, to pump 35 it has been cooled by three heat exchange processes to the lowest temperature attainable in that portion of the circuit.

Mixing Trays 25 and 26

A very important over-all new result of the present invention is the extent to which the dew point of wet natural gas is lowered after contact with glycol in the absorber 4. One contribution to this new result is the degree of intimacy brought about between the desiccant on trays 25 and 26 and the wet gas brought up through the trays. The efficiency of only two trays in absorber 4 is surprising. A major contribution to this efficiency is the nature of the specific path provided for the reconcentrated glycol over the trays.

The sectioned elevation of FIG. 2 begins the consideration of the novel arrangement of the trays which contributes to the new result of dew point lowering. Conduit 20 is shown arranged to bring the wet natural gas through wall 2 where it is directed under tray 25. FIG. 4 illustrates how the trays extend across shell 1. FIG. 2 illustrates how the trays extend horizontally and close to the longitudinal axis of the shell. Partition 70 extends up from the front end of tray 25 to seal to the upper half of the wall of shell 2. Partition 71 seals to the rear end of the tray 25, extending to the lower half of the wall of shell 2. These partitions 70 and 71 direct the wet gas from conduit 20 up through tray 25. Substantially the entire effective area of the tray is uniformly exposed to the gas stream.

Tray 26 is provided with partitions 72 and 73. Arranged as partitions 70 and 71, partitions 72 and 73 cause the gas stream up through tray 25 to reverse in direction to come up through tray 26. The result is flow of the wet gas through trays 25 and 26 in series, the trays being horizontal and in tandem, parallel to the longitudinal axis of shell 2.

FIG. 3 is a section along lines 3—3 of FIG. 2, with which is developed the relation between the discharge point for glycol onto the trays and the removal point from the trays. Additionally, the shape of the bubble caps mounted on the trays is disclosed to an extent.

Glycol is discharged on tray 26 from conduit 37 and is held to a predetermined level by the height of downcomer 41 extending up through the tray. Risers 75 are shown in position to conduct the wet gas upward from beneath the trays. Housings 76 fit over the individual risers in order to reverse the flow of the gas toward the bottom of the tray so it can be discharged up through the glycol.

The wet gas is specifically dispersed through the glycol by a sieve plate structure which is part of each housing 76. This sieve plate structure is arranged to form the bottom of a confined channel of the glycol, extending from the inlet conduit 37 to the discharge weir pipe 41. FIG. 5 illustrates this sieve structure in greater detail. The result of handling the wet natural gas in this manner is to disperse it with a high degree of uniformity, and in small streams, up through the glycol over substantially the entire effective area of the tray.

FIG. 4 is a sectioned plan view which further illustrates the elongated shape of housings 76. Looking down on the trays in this manner, the housings 76 are seen to extend parallel to the longitudinal axis of shell 1 and to be shorter than the width of the trays between partitions 70—71 and 72—73.

Referring to tray 25, the housings 76 are defined as arranged adjacent to each other, parallel to the horizontal axis of shell 1, and with every other one of the adjacent housings extending from one, or the other, of partitions 70 and 71. The result of this arrangement is to form, with the housings 76, on tray 25, a serpentine path from conduit 36 to exit 38, over substantially the complete tray area. The tray path, considered in cross-section as shown in FIG. 3, is relatively narrow and confined between housings 76. As indicated previously, the bottom of this continuous, serpentine, path is formed of perforated plates. These perforated plates are actually formed from the lower portions of the sides of the housings 76. The result of this arrangement, more specifically than heretofore described, is to direct gas up through the sieve formed by the plates over substantially the entire horizontal area of the confined channels of glycol as it traces its serpentine path from entrance to exit of the tray.

Liquid desiccant flowed onto mixing trays 25 and 26 can now be seen as not simply flooded from the point of entrance to a point of exit. The combination of partitions and housings define a precise path for the desiccant. The desiccant can not pile up, or form quiescent pools, anywhere on the tray. The flow of the glycol over the dispersing sieves for the wet natural gas is a well-ordered utilization of substantially the entire tray area to approach maximum efficiency of gas and glycol contact. All of the glycol is passed over each sieve section. The result is an intimacy of contact between liquid desiccant and wet natural gas, on a particular tray, which exceeds any prior arrangement. The end result is to utilize, to maximum advantage, the driving force created by the difference in water vapor pressures between the wet natural gas and the lean glycol. The art of dehydration of wet natural gas is greatly advanced by the concept embodied in this disclosed structure.

FIG. 5 is a perspective view of a portion of the bubble cap structure mounted on either of the trays of the absorber 4. When taken in connection with FIGS. 3 and 4, FIG. 5 shows the confined, relatively thin, channel of glycol to further advantage. Risers 75 are seen more clearly as elongated slits defined by parallel plates. The housing 76 may be defined as having a cross-section of inverted U-shape. One of the legs is flared outwardly in a plate portion 77 from a point intermediate the height of the leg and at a predetermined angle. These plate portions 77 are perforated with holes 78. The distance between adjacent housings 76 is established by the angle at which the plate portion 77 is flared from its leg.

It is readily appreciated, from FIG. 5, that plate portions 77 form the bottom of the confined, serpentine path, between the housings 76. The perforations 78 are evenly distributed over the area of plate portion 77, and these perforations are of such size and number as to give the desired degree of dispersion of wet gas up through the glycol in the path above the plates.

FIG. 5 also illustrates an automatic feature of gas dispersion through perforations 78 and plate 77. As the volume of gas fluctuates, up through a riser 75, the glycol between the riser and internal wall of its housing 76 varies in level. As the volume of gas changes, the glycol level will be changed and vary the number of holes 78 uncovered. With this arrangement, the number of holes 78 required to efficiently disperse the wet natural gas up through glycol are provided by the function of the gas volume itself in depressing the level of the glycol within housings 76. The result is an automatic adjustment of distribution of the wet natural gas over the entire tray area.

Vertical Absorber

FIG. 6 illustrates how an absorber vessel arranged in a vertical position utilizes the invention. Absorber shell 80 is in the form of a tank with its longitudinal axis extended vertically. Trays 81—84 are similar to trays 25 and 26 except that they are stacked one above the other within absorber shell 80. Bubble caps, similar to those described as mounted on trays 25 and 26 are mounted on each of trays 81—84. The caps are extended from the internal wall of absorber shell 80 to form the desired narrow, serpentine, path for the glycol on each tray.

Conduits 85—88 bring individual supplies of liquid desiccant to each of the trays. Downcomers 89 remove glycol from the trays to the bottom of the shell 80. The gas to be dehydrated flows, in series, up through the trays.

Pumps 90 and 91 are each similar to pump 35 of FIG. 1. Each pump delivers two parallel supplies of glycol to each pair of conduits 85—86 and 87—88. The rich glycol is removed from the bottom of shell 80 through conduit 92, and delivered to reconcentrator 93 through conduit 94. The reconcentrated, or lean, glycol is delivered in parallel, to pumps 90 and 91 from conduit 95.

The path of the wet gas to be dehydrated is obvious from the FIG. 6 disclosure. The gas is brought into the bottom of absorber shell 80, through conduit 96, and is removed from the top of the shell, through conduit 97. As the gas is brought up through trays 84, 83, 82 and 81 in turn, it is brought into contact with glycol on each tray which has the same water vapor pressure. The resulting depression of the dew point of the gas is much greater than on trays of other designs receiving glycol in series.

As in connection with FIG. 1 the reconcentrator 93 is illustrated as elevated above the pumps. The glycol is pumped to the reconcentrator and falls by gravity to the pumping point. The multiple heat exchanges between the rich glycol, liquids separated from the well stream and the dehydrated gas are not included in conduit 95. This reduction of the temperature of the dry glycol is adequately taught in FIG. 1 and can be employed here for the increase in absorption capacity of the glycol, obviating freezing of the separated liquids in the bottom of absorber shell 80 and the protection of the pump seals.

Dehydrator System Including a Spherical Absorber

FIG. 7 illustrates a complete liquid desiccant dehydrator system utilizing an absorber unit with a spherical housing. As in FIG. 1, the complete dehydrating unit is mounted on the framework of a skid.

No details of the actual mounting structure are shown. In FIGS. 7, skid 100 is only indicated in outline as including a heat exchanger in the form of a flat box. The absorber section of 101, reconcentrator unit 102, surge tank 103 and pump 104 are outlined on the skid 100, suitably cross-sectioned to illustrate the flow pattern of the fluid through the system. The actual form has been modified wherever simplicity is gained.

Pump 104 and reconcentrator 102 are similar in form and function to the pumps and reconcentrators of the preceding disclosures. Pump 104 supplies two streams, in parallel, of liquid desiccant, with equal water vapor pressures, to two trays of the absorber 101. The reconcentrator 102 dehydrates the rich desiccant from absorber 101 in the same fashion as the reconcentrator of the prior disclosures.

A surge tank 103 is mounted directly on the heat exchanger of skid 100. The conduit taking the rich glycol to the reconcentrator is not illustrated as routed through a heat exchanger in surge tank 103. This arrangement is, of course, possible as shown in FIG. 1. Conduit 105 is illustrated as arranged to drop the lean glycol directly into the heat exchange box 106 of skid 100.

FIG. 8 illustrates the heat exchange box 106, and skid 100 to somewhat better advantage. Barrel-shaped separator section 110 is illustrated as mounted down into heat exchange box 106 in order to let the fluid contents in the bottom of the separator section 110 be warmed by the hot lean glycol from reconcentrator 102. Freezing of the separator fluids, during cold weather operation, is thereby obviated.

Additional illustration of the mounting of the surge chamber 103 also appears in FIG. 8. The bottom of surge chamber 103 is open to flow from the heat exchange box 106. The inventory of liquid desiccant in the system is checked by a level gauge on the side of the surge chamber 103.

Heat exchanger 107 is also mounted on skid 100 to bring the dehydrated gas into heat exchange relation with the lean glycol. With this structure there is provided a plurality of heat exchange possibilities between the hot, lean glycol and the cooler fluids. The absorption capacity of the lean glycol is raised and the heat given up by the lean glycol prevents freezing of separator fluids during cold weather operation.

The flow pattern of the glycol through the system of FIG. 7 is simply illustrated. The rich glycol taken to the reconcentrator 102 is dehydrated and the lean glycol is taken down conduit 105 into a heat exchange box 106. The air-cooling of box 106 lowers the temperature of this hot glycol as well as the heat exchange with the liquids of separator section 110. The lean glycol spread through box 106 by conduit 105, surges up into chamber 103 and passes into heat exchange with the dehydrated gas in exchanger 107. The cooled glycol then reaches pump 104 at a temperature which will not endanger the pump seals. The cooled, lean glycol is then distributed to the trays of the absorber for intimate contact with the wet gas to be dehydrated. The rich glycol is then elevated by pump 104 to the stripping column of reconcentrator 102 to complete the cycle. The circuit of the wet gas dehydrated in absorber section 111 is now considered.

Separator and Spherical Absorber

Separator section 110 is in the general form of a vertical cylinder. This vertical cylinder extends down into heat exchange box 106 as shown in FIG. 8. On top of the vertical cylinder is mounted the spherical absorber section 111.

A well stream is brought into separator section 110 through conduit 112. Cylinder 113 is mounted in the lower wall of spherical absorber section 111 so as to be concentric with the cylindrical walls of separator section 110. A mist extractor 114 is mounted within cylinder 113 and the baffles and contactor trays of the absorber section 111 are mounted on the top of cylinder 113. As cylinder 113 extends down into the cylinder of separator section 110, an annular space is formed between them. Well stream conduit 112 directs its contents into this annular space.

Mist extractor 114 is mounted within cylinder 113. The bottom of mist extractor 114 is open to the lower portion of separator section 110. A downcomer 115 is arranged between mist extractor 114 and the internal walls of cylinder 113 in order to return liquids removed by extractor 114 to the liquid collection in the bottom of separator section 110.

The liquids that collect in the bottom of separator section 110 have their level controlled by a float 116. Mechanism not shown is actuated by float 116 to control the withdrawal of the liquids from the bottom of the separator through conduit 117.

The function of separator 110 is quite simple. The well stream, including gaseous and liquid phases, is brought into the separator through conduit 112. The well stream is flowed tangentially around the internal wall of separator 110 and the direction of its gases reversed to flow up through mist extractor 114 and drop liquids into the bottom of separator section 110. Liquids scrubbed from the gaseous phase up through mist extractor 114 are returned to the sump by downcomer 115.

The wet gaseous phase to be dehydrated then flows from the separator section up through cylinder 113 and into the spherical absorber 111.

Horizontal baffle 118 extends across cylinder 113. A diverting riser 119 becomes the path for the wet gas. Riser 119 is capped to reverse the flow of the wet gas and distribute the wet gas uniformly beneath contactor tray 120. FIGS. 9 and 10 are established to illustrate this structure in further detail.

With FIGS. 9 and 10 taken in connection with FIG. 7, it can be seen that horizontal baffle 118 has vertical baffles 121, 122 and 123 mounted thereon to baffle flow of the wet natural gas and cause it to flow in series up through contactor tray 120 and contactor tray 124. Baffle 125 depends from the top of the shell of absorber section 111. A second horizontal baffle 126 is spaced above horizontal baffle 118 to complete contactor trays 120 and 124 and baffle the flow of the gas through the trays in series. A portion of baffle 126 is actually the floor of the trays 120 and 124 having the bubble cap structures mounted directly thereon between the vertical baffles.

Lean glycol is brought to trays 120 and 124 through conduits 127, 128. Downcomer-weirs 129 and 130 maintain a predetermined maximum level of liquid desiccant on each of trays 120 and 124. Downcomer-weirs 129 and 130 extend down through baffle-tray 126 into a collection of rich glycol in the bottom of the housing shell of absorber section 111. Conduit 131 removes the combined rich glycol from shell 111 and returns it to pump 104. Pump 104 then delivers the rich glycol to reconcentrator 102 through conduit 132.

The path of the gas has already been substantially defined. After the gas has been baffled up through trays 120 and 124 in series it is removed through conduit 134 from the upper half of shell 111, above baffle 126, to the lower half of shell 111, below baffle 126. Conduit 134 is seen to best advantage in FIGS. 9 and 10. Conduit 134 has been deliberately left off FIG. 7 as needlessly encumbering the drawing.

Taking the gas through the lower portion of shell 111, over the surface of the glycol collected there, gives further opportunity for water to be absorbed from the gas. The dehydrated gas is finally removed from shell 111 through conduit 135. Conduit 135 leads the gas into heat exchanger 107 where it cools the lean glycol from surge tank 103 just prior to the lean glycol reaching pump 104. The dehydrated gas is removed from heat exchanger 107 as the end product of the process and the lean glycol reaches the pump with a temperature which will not endanger the seals of pump 104.

From the foregoing it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A bubble cap for a liquid-gas contacting structure for the absorber vessel of a liquid desiccant dehydrator system for natural gas comprising;
    an elongated housing having,
        (a) the general cross-sectional shape of an inverted U,
        (b) one of the two legs extending vertically in the form of a solid plate,
        (c) and the second of the two legs flared outwardly from a point intermediate its height at a predetermined angle and evenly perforated to distribute gas from within the housing over the entire horizontal area in liquid desiccant between the housing and an adjacent housing and overlying the flared portion of the leg determined by the rate of gas flow from within the housing;
    and a riser mounted within the housing to conduct gas from beneath the common mounting of both the housing and riser into the top of the housing.

2. A liquid desiccant dehydrator system for wet gas including,
    means for circulating a liquid desiccant which will absorb water from gas brought into intimate contact with the liquid desiccant through the system,
    an elongated cylindrical shell receiving wet gas in one end and discharging dehydrated gas from the opposite end,
    a series of flat trays mounted within the shell,
    baffles mounted within the shell so as to direct the incoming wet gas in series through the trays and up through the trays,
    said means including parallel connections to the trays for supplying liquid desiccant of uniform concentration to all of the trays to bring the liquid desiccant into intimate contact with the gas as the gas flows through the vessel and up through the trays.

3. A liquid desiccant dehydrator system for wet gas including,
    means for circulating a liquid desiccant which will absorb water from gas brought into intimate contact with the liquid desiccant through the system,
    an elongated cylindrical shell having its longitudinal axis horizontally extended while receiving wet gas in one end and discharging dehydrated gas from the opposite end,
    a series of flat trays mounted within the shell and oriented horizontally and in line with one another and parallel to the axis of the shell to receive the liquid desiccant in a confined path on each tray,
    baffles mounted within the shell so as to direct the incoming wet gas in series through the trays and up through the perforations in the bottom of the confined path of each tray,
    said means including parallel connections to the trays for supplying liquid desiccant of uniform concentration to all of the trays to bring the liquid desiccant into intimate contact with the gas as the gas flows through the vessel and up through the trays.

4. A liquid desiccant dehydrator system for wet gas including,
    means for circulating a liquid desiccant which will absorb water from gas brought into intimate contact with the liquid desiccant through the system,
    an elongated cylindrical shell having its longitudinal axis horizontally extended while receiving wet gas in one end and discharging dehydrated gas from the opposite end,
    a series of flat trays mounted within the shell and oriented horizontally and in line with one another and parallel to the axis of the shell to receive the liquid desiccant in a confined path of serpentine shape on each tray,
    baffles mounted within the shell so as to direct the incoming wet gas in series through the trays and up through the perforations in the bottom of the serpentine confined path of each tray,
said means including parallel connections to the trays for supplying liquid desiccant of uniform concentration to all of the trays to bring the liquid desiccant into intimate contact with the gas as the gas flows through the vessel and up through the trays.

5. A liquid desiccant dehydrator system for wet gas including,
means for circulating a liquid desiccant which will absorb water from gas brought into intimate contact with the liquid desiccant through the system,
an elongated cylindrical shell having its longitudinal axis horizontally extended while receiving wet gas in one end and discharging dehydrated gas from the opposite end,
a series of flat trays mounted within the shell and oriented horizontally and in line with one another and parallel to the axis of the shell to receive the liquid desiccant in a confined path of serpentine shape on each tray,
a series of elongated housings mounted on the bottom of each tray and extending from the sides of each tray in a pattern to form the elongated serpentine path on each tray,
riser conduits mounted on each tray and within each elongated housing to convey gas from beneath each tray into the housings and downwardly within the housings,
a perforated plate as at least a portion of a wall of each housing arranged to extend completely across the portion of the elongated path adjacent the housing through which the downwardly directed gas within the housing is distributed up through the liquid desiccant over an effective horizontal area of the path,
baffles mounted within the shell so as to direct the incoming wet gas in series through the trays and up through the riser conduits of each tray,
said means including parallel connections to the trays for supplying liquid desiccant of uniform concentration to all of the trays into intimate contact with the gas as the gas flows through the vessel and up through the tray risers and perforated plates.

6. A liquid desiccant dehydrator system for wet gas including,
means for circulating a liquid desiccant which will absorb water from gas brought into intimate contact with the liquid desiccant through the system,
an elongated cylindrical shell having its longitudinal axis horizontally extended while receiving wet gas in one end and discharging dehydrated gas from the opposite end,
a series of flat trays mounted within the shell and oriented horizontally and in line with one another and parallel to the axis of the shell to receive the liquid desiccant in a confined path of serpentine shape on each tray,
a series of elongated housings, with each housing;
  (a) having the general cross-sectional shape of an inverted U,
  (b) being mounted on the bottom of its tray and extending from the sides of its tray so the series of housings on each tray will form an elongated serpentine path on each tray,
  (c) and having a perforated portion of one leg of its U shape flared outwardly at an angle to extend into the portion of the elongated path adjacent the housing;
and riser conduits mounted on each tray and within each elongated housing to conduct gas from beneath each tray into the top of the housings on each tray from where the gas flows downwardly within the housings until discharged out the perforated housing leg and up through the liquid desiccant over an effective horizontal area of the path determined by the rate of flow of the gas,
baffles mounted within the shell so as to direct the incoming wet gas in series through the trays and up through the riser conduits of each tray,
said means including parallel connections to the trays for supplying liquid desiccant of uniform concentration to all of the trays to bring the liquid desiccant into intimate contact with the gas as the gas flows through the vessel and up through the tray risers and perforated leg portions of the housing.

References Cited in the file of this patent

UNITED STATES PATENTS

| | | |
|---|---|---|
| 380,040 | Klonne | Mar. 27, 1888 |
| 410,634 | Bolton | Sept. 10, 1889 |
| 708,826 | Paul et al. | Sept. 9, 1902 |
| 2,094,342 | Bichowsky | Sept. 28, 1937 |
| 2,184,998 | Kaufman | Dec. 26, 1939 |
| 2,428,643 | Young | Oct. 7, 1947 |
| 2,715,945 | Hankison et al. | Aug. 23, 1955 |
| 2,735,506 | Glasgow | Feb. 21, 1956 |
| 2,787,451 | Lavery | Apr. 2, 1957 |
| 2,812,827 | Worley et al. | Nov. 12, 1957 |

FOREIGN PATENTS

| | | |
|---|---|---|
| 6,000 | Great Britain | 1892 |
| 9,556 | Great Britain | June 29, 1895 |